United States Patent [19]
Kightlinger

[11] Patent Number: 5,228,144
[45] Date of Patent: Jul. 20, 1993

[54] WATER SAVING DEVICE FOR TOILETS

[76] Inventor: Paul E. Kightlinger, 8410 E. Rolling Ridge, Tucson, Ariz. 85710

[21] Appl. No.: 884,935

[22] Filed: May 18, 1992

[51] Int. Cl.[5] .............................. E03D 1/14
[52] U.S. Cl. .............................. 4/324; 4/415
[58] Field of Search ............... 4/324, 325, 327, 415

[56] References Cited

U.S. PATENT DOCUMENTS

| | | | |
|---|---|---|---|
| 2,632,180 | 3/1953 | Pegler | 4/43 |
| 2,883,675 | 4/1959 | Hartman, Jr. | 4/324 |
| 3,590,395 | 7/1971 | Wustner | 4/324 |
| 3,662,408 | 5/1972 | Knudtson | 4/67 |
| 3,858,250 | 1/1975 | Coglitore | 4/324 |
| 3,955,218 | 5/1976 | Ramsey | 4/56 |
| 3,994,029 | 11/1976 | Badders | 4/41 |
| 4,000,526 | 1/1977 | Biela et al. | 4/325 |
| 4,145,774 | 3/1979 | Sullivan | 4/325 |
| 4,149,283 | 4/1979 | Knudston | 4/324 |
| 4,175,296 | 11/1979 | Goldman | 4/325 |
| 4,225,987 | 10/1980 | Goldman et al. | 4/324 |
| 4,304,015 | 12/1981 | Hubatka | 4/407 |
| 4,698,859 | 10/1987 | Freed | 4/393 |
| 4,868,933 | 9/1989 | Chen | 4/415 |
| 4,945,580 | 8/1990 | Schmitt et al. | 4/325 |
| 5,004,462 | 4/1991 | Mahler | 4/325 |

Primary Examiner—Henry J. Recla
Assistant Examiner—Charles R. Eloshway
Attorney, Agent, or Firm—J. Michael McClanahan

[57] ABSTRACT

A water saving device for toilets providing both partial flush and full flush capability is disclosed wherein for the partial flush, air is controllably removed from the interior cavity of a flapper valve to render the flapper valve non-buoyant to return it to its sealing position on the valve seat and terminate flow of water out of the reservoir tank. Removal of air from the flapper valve cavity is rendered a function of the dropping water level in the reservoir tank by attachment of one end of flexible tubing to the flapper valve contained air cavity, the other end of the flexible tubing communicating with the interior cavity of a cylinder, the cylinder having one closed end and one open end, the open end residing downward in the water. As water drops in the toilet tank, it also drops in the cylinder and air is sucked from the flapper valve cavity. When the water level drops sufficiently, enough air is removed from flapper valve cavity to render the flapper valve non-buoyant, and the flapper valve returns to its seat, closing off the flow of water out of the tank and into the toilet bowl. Thus a partial flush is effected. A full flush is effected by continually holding up the flapper valve.

10 Claims, 2 Drawing Sheets

WATER SAVING DEVICE FOR TOILETS

BACKGROUND OF THE INVENTION

1. Field of the Invention

The field of the invention is devices utilized in toilet water reservoir tanks which allow for a partial or full flush of the toilet, the partial flush achieved by limiting the water draining from the reservoir tank into the toilet bowl.

2. Description of the Related Art

Inasmuch as many parts of the United States, and especially the West and the Southwest regions, experience water supply shortages, it has now become very popular to conserve water by reducing water usage. To this end, the toilets found in residences and businesses are being modified to provide for a smaller flush, i.e., the water reservoir tank is being reduced from a five gallon capacity to a two to three gallon capacity. In addition, many devices and inventions are coming forth which permit the user to effect a partial or "mini" flush wherein only a portion of the water held in the reservoir tank is utilized. Experience tends to indicate that a partial flush operates satisfactory for liquid wastes, however, in most cases, a partial or "mini" flush is not satisfactory to remove solid wastes. Accordingly, many of the devices which provide for a partial or "mini" flush also provide for a full flush, the choice being made at the time of use.

One such device is shown in the U.S. Pat. No. 4,149,283 to Knudtson. Here a rather complicated mechanism allows selective manipulation of the toilet tank handle to vary the time that a buoyant drain valve takes to re-seat after the flush is first begun, thus allowing only a part of the contained water to exit the tank.

Another device is shown in the U.S. Pat. No. 3,955,218 to Ramsey, wherein a partial or mini flush is provided for utilizing an air venting hole in the upper region of a bell shaped flapper valve but below its annularly shaped sealing flange. As the outside handle is pushed down, the flapper valve is pulled upward, the flapper valve is pulled upward and pivoted off the valve seat, entrapped air within an inverted bell shaped cavity of the flapper valve is allowed to escape through the air venting hole. It is this entrapped air within the bell shaped cavity that renders the flapper valve buoyant and keeps it from re-seating immediately upon the valve seat. The bell shaped cavity has an opening at its lower end. As air escapes from the cavity, a point is reached where the flapper valve is no longer buoyant in the water, and it returns to the valve seat. The size of the hole is adjusted to regulate the rate of release of air from the contained cavity or plenum over time so that not all the water exits the reservoir tank. A full flush may be accomplished by continuing to hold the outside handle down so that the lever arm attached to the handle continually holds up the flapper valve by a connecting chain.

It is noted that the air vent hole in the flapper valve is placed below the annular flange of the flapper valve which actually seals to the valve seat, otherwise, the vent hole would allow continual escape of water from the reservoir tank.

Lastly, Sullivan, in U.S. Pat. No. 4,145,774 provides for a limited or mini flush by providing the handle of the flush mechanism so constructed that if a limited or mini flush is desired, the handle, after being pushed down, must be manually returned to its pre-flush position by the operator. By such action, the interior flapper valve is freed from action upon it by the lever arm in order that it may return to its seated position after a specified time. Return of the flapper valve to its seated position is accomplished by substantially utilizing the invention of Ramsey wherein air entrapped in the interior plenum or cavity of the bell shaped flapper valve may progressively escape. To effect a normal full flush in Sullivan's device, the operator pushes the handle down at the beginning of the operation. The handle returns to its normal pre-flush position after all the water in the tank has drained.

The above devices certainly accomplish their desired purposes; however, the device of Knudtson incorporates rather extensive, complicated, and costly equipment while Sullivan incorporates a rather complicated handle. The device of Ramsey, which appears to be the simpler of the devices, provides for a mini or partial flush, however, the amount of water which is allowed to drain into the toilet bowl is not controlled with precision, it only being a function of how long it takes for sufficient air to escape from the cavity of the flapper valve non-buoyant so that it returns to its seated position terminating the outflow of water. Such operation of the invention is largely controlled by the size of the air vent hole and whether or not it becomes clogged.

In view of the foregoing, it would be useful to provide a simple device which allows for a full flush or a partial flush of a toilet at the option of the user at the time of use. In particular, it would be particularly useful if the amount of water which is to be incorporated in the partial flush be determined with relative precision and repeatable from flush to flush.

SUMMARY OF THE INVENTION

The embodiment of the invention describes consists of a conventional bell type flexible rubber flapper valve used commonly in connection with toilets, the flapper valve modified to permit the air normally entrapped in the cavity or plenum of the flapper valve to escape under controlled conditions. The escape of air from the flapper valve bell shaped internal cavity is controlled in the invention as a function of the level of water in the toilet reservoir tank rather than how fast the air can escape from a vent hole in the flapper valve.

More particularly, one end of a piece of flexible tubing operably connects to the bell shaped flapper valve to place the air passageway of the tubing in communication with the interior cavity which the other end of the flexible tubing connects to the one closed end of a cylinder with its open end residing downward in the water of the reservoir tank. The cylinder may be wholly or partially in the water. The cylinder, being open at its lower end, allows for entrance of water into its cavity. The water level in the cylinder maintains the same height as the level in the reservoir tank which means that the cylinder may be wholly full of water (depending upon its location). The flexible tubing must, however, rise out of the water at some point between its connection with the flapper valve and the cylinder.

When the toilet flush handle lever arm, connected by chain to the flapper valve, lifts the flapper valve as the toilet is being flushed, the flapper valve pivots upward to a position over the valve seat, terminating the seal between the flapper valve flange and the valve seat, and thus allows the water entrapped in the reservoir tank to exit the tank through the central opening of the valve seat and into the toilet bowl.

Under normal conditions and prior to application of the invention to the toilet, the flapper valve remains above the valve seat by virtue of the fact that air entrapped in the bell shaped plenum central to the flapper valve renders the valve buoyant. Then, as the water level drops, the flapper valve returns to seat on the valve seat, the flapper valve sealing its flange around the valve seat as the water level is at or about the valve seat height.

In the invention, air entrapped in the bell shaped plenum of the flapper valve is allowed to controllably escape through the flexible tubing into the upper portion of the cavity of the cylinder. The water level in the cylinder drops consonant with the water level in the reservoir tank, thus pulling or sucking the air from the bell shaped plenum of the flapper valve, making the flapper valve less and less buoyant. Of course, water is under pressure to enter the bottom opening of the inverted bell shaped cavity of the flapper valve and thereby helps push the air out of the cavity. When sufficient air has been sucked and pushed from the flapper valve cavity to render the flapper valve non-buoyant, the flapper valve returns to its position on the valve seat and terminates the flow of water.

The level at which the flapper valve returns to the valve seat is determined by a number of factors which can work together or independently of each other. The first is the position of the cylinder in the tank relative to the water level such that as the water level in the cylinder falls with the water level in the tank, the point at which the flapper valve closes is carefully controlled. The second factor is the volume of the contained cavity of the cylinder. Lastly, the location of the rim of the open end of cylinder factors into the operation of the device. Through use of these factors, control of the volume of water used in the partial flush is repeatedly achieved.

Concerning the second factor and third factor, if the volume of the cylinder is too small to receive sufficient air from the flapper valve to render it non-buoyant, the cylinder is positioned such that the flapper valve will drop to the valve seat first as the water level clears the bottom rim of the cylinder open end by virtue of the fact that the air in the flapper valve can now rush out of the bottom of the cylinder.

Other embodiments include attaching a sharpened piece of rigid tubing to the first end of the flexible tubing, the sharpened end of the rigid tubing used to puncture the rubber flapper valve much like a hypodermic needle. In a case such as this, the need to form an opening in the upper portions of the flapper valve to receive the rubber tubing is avoided or the need to form a protruding tube in the flapper valve which mates with the flexible tubing.

In addition, a still further embodiment avoids the use of a cylinder whereby the second end of the flexible tubing becomes the cylinder itself. In such a case, the air in the flapper valve cavity exits the flexible tubing when the water level in the tank has passed just below the open end of the flexible tubing.

Lastly, a holder is provided to secure the flexible tubing at a point between the flapper valve and the cylinder, preferably proximate its second end joining the cylinder. The holder may rest upon the top lip of the tank, securing the flexible tubing at a point out of the water.

In the event that a full flush is desired, all the operator need do is to keep the flush handle continually depressed for the whole flush, thus causing all the water in the reservoir tank to run out. In doing so, the lever arm connected by the chain to the flapper valve holds the flapper valve above the valve seat so that, even though the flapper valve becomes non-buoyant, it is still forcibly held above the valve seat.

Accordingly, it is an object of the present invention to provide a simple device which permits for a partial flush of a toilet.

It is another object of the subject invention to provide a simple device which provides for a specific volume of water to be used in a partial flush of a toilet, and which operation is repeatable.

It is still another object of the subject invention to provide a simple device for effecting a partial flush of a toilet wherein the present existing elements of the toilet are employed with minor modifications.

Other objects of the invention will in part be obvious and will in part appear hereinafter. The invention accordingly comprises the apparatus possessing the construction, combination of elements, and arrangement of parts which are exemplified in the following detailed disclosure and the scope of the application which will be indicated in the claims.

BRIEF DESCRIPTION OF THE DRAWINGS

For further understanding of the features and objects of the subject invention, reference should be made to the following detailed description taken in combination with the accompanying drawings wherein.

In various views, like index numbers refer to like elements.

DETAILED DESCRIPTION OF THE PREFERRED EMBODIMENT

Figure 1:
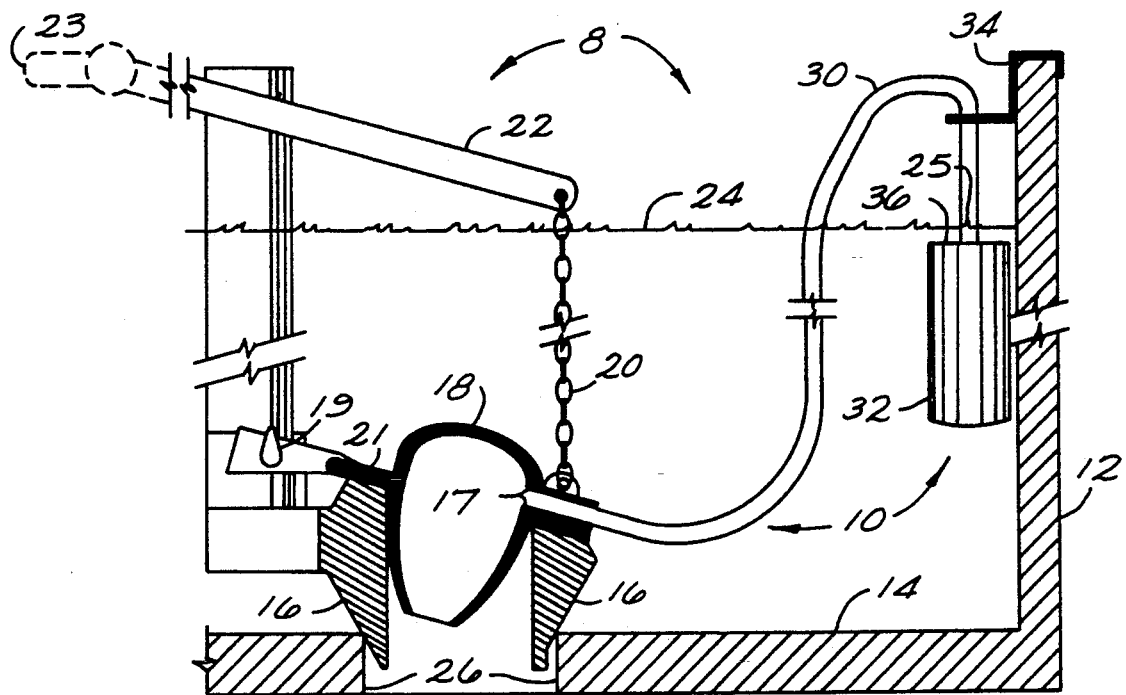
FIG. 1 is a partial cross sectional view of a typical toilet reservoir tank with the invention in place.

Referring to FIG. 1, a cross sectional view of a portion of toilet water reservoir tank 8 with the invention in place is shown. Central to bottom 14 of the tank 8 is valve seat 16 through which the water in the tank drains when float or flapper valve 18 is raised by chain 20 attached to the end of lever 22. Lever 22 is attached to flush handle 23. Water is shown in the tank having a level 24, being the normal full level. The above described elements are common in toilet tanks and control the flow of water through the outlet 26 and into the bowl (not shown) of the whole toilet assembly when the toilet is flushed. To effect a flush of the standard usual toilet, lever 22 is raised by rotation of handle 23 (on the outside of the toilet tank), Chain 20 attached to lever 22 pulls flapper valve 18 off seat 16 by pivoting it upwards. With flapper valve 18 off seat 16, water flows through the center opening of seat 16 and out outlet 26. Flapper valve 18, once lifted off seat 16, is buoyant and is suspended in the water above seat 16 by virtue of air trapped inside an inverted bell shaped interior cavity of valve 18.

As the water level 24 subsides in the unmodified standard toilet, flapper valve 18 eventually falls and reclaims its original position with its annular flange 21 sealing to seat 16 and thus terminates the flow of water through seat 16 and outlet 26.

During the flush operation, a float operated valve (not shown) allows new water to flow into toilet reservoir tank 8 so that even during discharge of the present water in the tank, new water is being introduced, although at a slower rate. When flapper valve 18 is resealed on seat 16, incoming water begins to fill reservoir tank 8 until the water reaches its usual level, i.e., the level shown by level 24. At that time, the float operated valve (not shown) cuts off the flow of incoming water.

The invention, a device used to effect a partial flush and shown by numeral 10, resides in the water tank and incorporate flapper valve 18. More specifically, partial flush device 10 comprises modified flapper valve 18, flexible plastic or rubber tubing 30, plastic or metal cylinder 32 and plastic or metal tubing holder 34. The air passageway interior to flexible tubing 30 communicates the interior cavity or plenum of the bell shaped portion of flapper valve 18 to the top closed end of cylinder 32, the bottom end of cylinder 32 being open. To enable flexible tubing 32 to communicate with the interior of flapper valve 18, opening 17 has been made through the top wall of flapper valve 18 above flange 21, preferably in the front portion of the cavity since, as it will be seen later, air within the interior cavity of flapper valve 18 is evacuated. To assure that sufficient air is evacuated to render the flange valve non-buoyant, it may be necessary to remove substantially all of the air. Placing hole or opening 17 in the portion of the wall of flapper valve 18 farthest away from the hinged portion 19 is recommended since the last remaining air interior to flapper valve 18 accumulates there during the time the flapper valve is buoyant.

Penetration through opening 17 in the top wall of flapper valve 18 may be made by flexible tubing 30 inserted into the opening. A proper adhesive should be used to make the connection air tight, or a short piece of rigid plastic tubing may be inserted through the formed opening in flapper valve 18 and then flexible tubing 30 secured on the outside of that rigid tubing. It is recommended that an adhesive be used to render all joints air tight.

Alternately, a short stem with an air passageway may be molded into flapper valve 18 during manufacture. In such case, flexible tubing 30 is attached to the stem by any one of a number of obvious methods.

Flexible tubing 30 then rises up and out of the water, above water level 24, is secured to holder 34, and then enters closed end 36 of cylinder 32. Flexible tubing 30 may be attached to cylinder 32 by similar methods used to attach the tubing to flapper valve 18, i.e., tubing 30 may protrude just slightly interiorly to cylinder 32 through an opening formed in top end 36. A proper adhesive should be used to assure that the connection is air tight. Alternately, a short piece of rigid tubing having an air passageway may extend outward from top end 36 of cylinder 32, flexible tubing 30 then encompassing that short piece of rigid tubing. The bottom of cylinder 32 is open in order that water from the tank may enter the cylinder.

Flexible tube holder 34 secures the tubing in such a way to secure cylinder 32 in the position shown and such that cylinder 32 does not move as a water level 24 moves up and down. Alternately, cylinder 32 may be made of heavy material, such as a metal or thick walled plastic, so that it is not buoyant in water and continually pulls down on tubing holder 34 by pulling on flexible tubing 30. Lastly, the position of cylinder 32 is adjusted up or down in the toilet tank by positioning flexible tubing 30 on holder 34. Holder 34 may be a piece of metal or plastic sheet, formed as shown to cup over the top of the vertical wall 12 of tank 8, having an outstanding horizontal plate with an opening therethrough to receive the flexible tubing. If the opening through holder 34 is only slightly smaller than the tubing, there will be sufficient friction to secure the tubing in place and to suspend cylinder 34.

The toilet flush in a standard or regular toilet is initiated when lever 22 is raised by rotating downward handle 23 on the outside of the toilet tank. This causes flapper valve 18 to pivot upward and off valve seat 16. Water stored in the tank reservoir then commences to flow through the center opening of seat 16 and out outlet 26. If lever 22 is continually held up, all the water in the toilet tank above valve seat 16 will flow through outlet 26, including water incoming into the tank. Releasing lever 22 permits annular flange 21 of flapper valve 18 to return to its sealing position atop valve seat 16 and water then begins to refill the tank. This is the standard full flush.

The invention works in conjunction with flushing mechanism as follows. If lever 22 is raised causing flapper valve 18 to pivot off seat 16 and handle 23 is released, lever 22 falls to its original at rest position. Flapper valve 18, however, is buoyant and floats in the water above valve seat 16. Buoyancy of flapper valve 18 is due to the air entrapped inside the interior cavity or plenum of the bell shaped portion of the flapper valve. The bottom of flapper valve 18 is open which allows water to enter the interior cavity of flapper valve 18 as the air is removed. By removing air interiorly to flapper valve 18, flapper valve 18 will reach the point where it is no longer buoyant and then it will settle back upon seat 16 to terminate flow of water through outlet 26.

The next task is to regulate the point in the flushing process where flapper valve 18 is no longer buoyant and returns to its seated position. By doing so, the flush is terminated resulting in a partial flush. This is accomplished by means of the flexible tubing 30 communicating the interior cavity of flapper valve 18 to the interior cavity of cylinder 32.

Firstly, as water fills tank 24 after a flush operation, water will enter the open bottom of cylinder 32 and rise to the same level as that of water level 24. As shown in FIG. 1, the water would rise in cylinder 32, completely filling it, and then rise to level 25 in flexible tubing 30 attached to the top end 36 of cylinder 32. Water enters cylinder 32 because the air which was inside cylinder 32 bleeds out and down through flexible tubing 30 into the interior of flapper valve 18 and into outlet 26. Thus, there is no impediment to the filling of cylinder 32 by water as the water level rises in the toilet tank reservoir.

Note the requirement that flexible tubing 30 must rise out of the top end of cylinder 32 and above water lever 24 before it re-enters the water for its attachment to flapper valve 18. If tubing 30 did not rise above water level 24, water inside cylinder 32 would continually drain through tubing 30 into the cavity of flapper valve 18 and out outlet 26.

When a partial flush is desired, handle 23 is pushed downward resulting in lever 22 raised to lift flapper valve 18 off seat 16. Handle 23 is allowed to return to its prior position which lowers lever 22. Flapper valve 18, however, being buoyant, remains above seat 16 and the water in the tank reservoir proceeds to enter the central opening of seat 16 and exit outlet 26. As water level 24 falls, water level 25 interiorly to cylinder 32 will also fall, the two levels falling substantially together, any slight difference being due to surface tension of the water around the interior walls of cylinder 32. As the water interiorly to cylinder 32 drops, air must replace it in the top of cylinder 32 and that air is obtained from the interior cavity of flapper valve 18. Thus, cylinder 32 acts as a "suction pump" to pull air from the interior of flapper valve 18.

When water level 24 has fallen sufficiently that enough air has transferred from the cavity of flapper valve 18 to the top of cylinder 32 to render flapper valve 18 non-buoyant, it then returns to its sealing position atop seat 16. Depending upon the diameter of cylinder 32 and its length, i.e., its volume, water level 24 may or may not fall to the bottom rim of cylinder 32 before flapper valve 18 re-seats. If cylinder 32 is particularly short in length and not great in diameter, then once level 24 has fallen below the rim of cylinder 32, air interiorly to the cavity of flapper valve 18 will then rush out at an increased rate through the open end of cylinder 32. It is to be remembered that helping to evacuate air from the upper portion of the cavity of flapper valve 18 is water attempting to enter the bottom opening of flapper valve 18. Thus, in addition to the falling water level in cylinder 32 pulling air from the top of the cavity of flapper valve 18, water entering the bottom opening of flapper valve 18 is also pushing air out.

Figure 2:
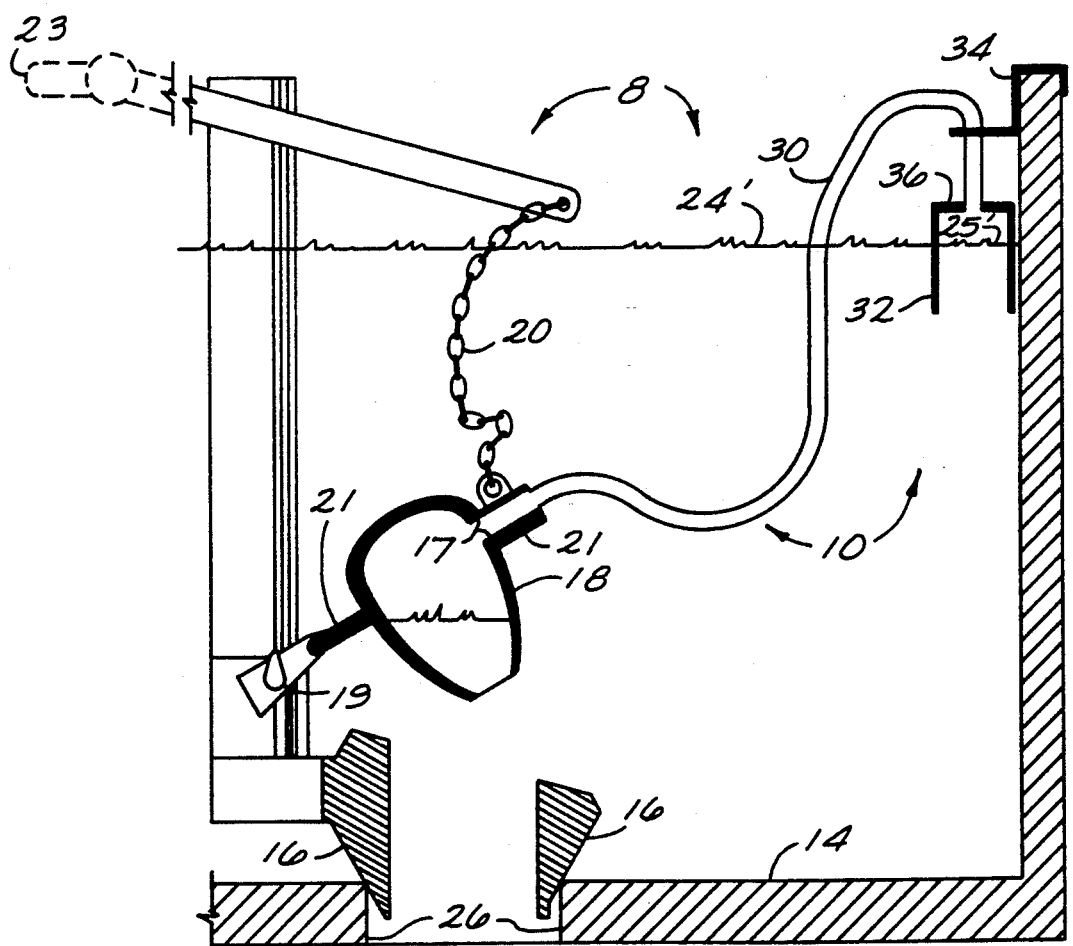
FIG. 2 is a partial cross sectional view of a typical toilet reservoir tank with the invention in use.

Referring now to FIG. 2, a second partial cross sectional view of toilet reservoir tank 8 with the invention in place is shown. Here, the flapper valve is elevated in its buoyant position allowing the water in tank reservoir 8 to escape through the central opening of valve seat 16 and outlet 26 into the bowl of the toilet (not shown). It is apparent in FIG. 2 that the new water level 24' is below the former water level 24 (FIG. 1), bringing down water level 25' interiorly to cylinder 32. By the falling of water level 25' in cylinder 32, air is transferred from interiorly flapper valve 18 through flexible tubing 30 into the top of cylinder 32. Thus, the falling of water level 25' in cylinder 32 acts as a "suction pump" to extract the air from the interior plenum of flapper valve 18. Of course, water is always attempting to enter the bottom opening of flapper valve 18 so the combined effect of water sucking and pushing the air out is operating.

Falling water level 24' (and also water level 25') will reach a level at which sufficient air from the interior cavity of flapper valve 18 has been transferred to cylinder 32 so that flapper valve 18 is no longer buoyant. At that point in time, flapper valve 18 will pivot down, re-seating itself on seat 16 and thus terminate the flow of water from tank reservoir 8 out the outlet 26. That point may occur prior to water level 24' falling below the lower circular rim or edge of the open end of cylinder 32. However, if water level falls below the lower circular edge of cylinder 32 and flapper valve 18 has not yet returned to seat 16, the air interiorly to flapper valve 18 will be pushed out by the incoming water and flapper valve 18 will immediately return to seat 16. The air escapes out the bottom of cylinder 32.

Thus, the point at which it is desired the flapper valve 18 to return to its seat vis-a-vis the falling water level in the tank may be easily determined by one of two ways. The first is to control the interior volume of cylinder 32 (i.e., size of cylinder 32) and its relative placement in the tank such that as water level 24' falls taking with it water level 25 interiorly to cylinder 32, the interior volume of cylinder 32 which receives air from flapper valve 18 is sufficient to receive enough air to render flapper valve 18 non-buoyant.

The second method is to use a smaller cylinder 32, but to locate the lower open mouth of cylinder 32 below water at a point in the tank reservoir such that when water level 24' drops below the opening of cylinder 32, contained air in the interior plenum of flapper valve 18 will rush out of cylinder 32 and thus render the flapper valve no longer buoyant, permitting it to return to valve seat 16.

Accordingly, it is apparently obvious that another embodiment of the invention is possible wherein use of cylinder 32 is avoided, and the open end of flexible tubing 30 is merely positioned in the toilet tank below water level 24', but at the appropriate level when the partial flush is to terminate.

Figure 3:
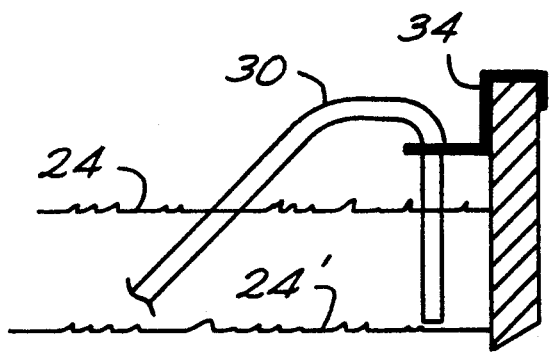
FIG. 3 is a partial cross sectional view of an alternate embodiment of the invention.

More particularly, shown in FIG. 3 is the alternate embodiment above spoken wherein flexible tubing 30 has been extended and secured down into the water below the standing water level 24. Shown in FIG. 3 is fallen water level 24' (in dotted form) to which the water has fallen, now below the open end of flexible tubing 30. At this point, air now may exit the interior plenum of flapper valve 18 (caused by the in-rushing water, FIG. 2) through flexible tubing 30 so that nearly all of the air in the plenum escapes and flapper valve 18 pivots down onto seat 16 wherein flow of water through outlet 26 is terminated. It is noted that in FIG. 3, tubing holder 34 is shown securing tubing 30 at a point above standing water level 24 (tubing holder 34 need not to be above the water, however, flexible tubing 30 must have some portion above the water).

Figure 4:
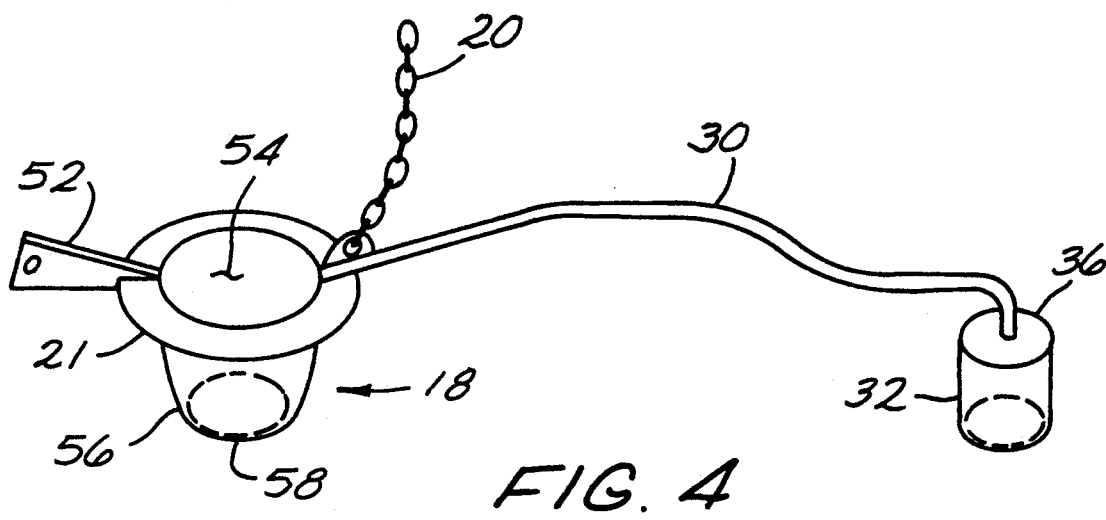
FIG. 4 is a perspective view of the device of the invention prior to installation in a toilet.

FIG. 4 shows a perspective view of the elements of the invention separated from the reservoir of toilet tank 8. In FIG. 4, shown is flapper valve 18 consisting of an annular flap 21 which actually makes the circular seal around seat 16 (not shown) with pivot arm 52 attached to flapper valve annular flange 21, pivot arm 52 pivotally secured to an upright member situated in the toilet tank (not shown). Flapper valve 18 pivots about an opening in pivot arm 52 through which protrudes a pin attached to the upright member (not shown), flapper valve 18 pivoting above seat 16 and thereby opens the tank reservoir to the exiting water. The upper portion of flapper valve 18 comprises a hemispherical top and the lower portion consists of a bottom cone or inverted bell shaped portion which, when seated on seat 16, resides interiorly to the central opening of valve seat 16. At the lower part of bell shaped portion 56 is opening 58 by which entrance to the interior cavity may be gained. Interiorly to bell shaped portion 56 and hemispherical top 54 is the bell shaped plenum or cavity which contains air to render flapper valve 18 buoyant above seat 16 after it has been lifted off seat 16 by chain 20 attached to lever 22 (not shown).

Protruding interiorly through an opening in the top hemisphere of flapper valve 18 is flexible tubing 30, the interior passageway of which communicates with the plenum interiorly to flapper valve 18. At the other end of flexible tubing 30 is connected the single closed end of open ended cylinder 32, top end 36 being penetrated by tubing 30. Here again, the open passageway of flexible tubing 30 communicates with the plenum interiorly to cylinder 32.

Figure 5:
FIG. 5 is a partial cross sectional view of another alternate embodiment of a portion of the device of the invention.

It becomes very apparent that flapper valves 18 commonly available may be utilized for the subject invention without modification if entrance into the interior cavity may be easily gained. Access to the interior cavity is afforded if one end of flexible tubing 30 is connected to a sharpened piece of rigid tubing. Referring now to FIG. 5, to one end of flexible tubing 30 has been added a short piece of rigid tubing 60 which has been provided with a sharpened point, much like a hypodermic needle. This sharpened point is pushed through the soft rubber of flapper valve 18 so as to communicate with the plenum therein. By such means, already existing flapper valves may be utilized to comprise a portion of the invention.

It is also apparent that by adjustment of the relative height position of cylinder 32 (FIGS. 1 and 2) in the toilet reservoir tank, the water used for a partial flush may be varied. For example, locating cylinder 32 at a relatively high elevation in the reservoir tank will result in a partial flush using a relatively small volume of water, such as one gallon. Locating cylinder 32 at a deeper or lower position in the reservoir tank will result in more water utilized in the partial flush, for example, two gallons. It is therefore apparent that the volume of water utilized in a partial flush may be varied from almost no water to all the water in the reservoir tank, i.e., a full flush.

It is also noted that once a full flush has started and the water level passes the partial flush level, the full flush may be terminated by releasing the flush handle since by that time all air has been evacuated from the flapper valve cavity and it is now non-buoyant and will return to the valve seat.

While a preferred embodiment of the device has been shown and described together with alternate embodiments, it will be understood there is no intent to limit the invention by such disclosure, but rather it is intended to cover all modifications and alternate constructions falling with in the spirit and the scope of the invention as defined in the appended claims.

I claim:

1. A water saving device providing partial flush capability for toilets of the type having a reservoir tank to contain water for flushing, the water have a pre-flush level in the reservoir tank, a valve seat situated in the bottom of the reservoir tank through which the stored water passes when the toilet is flushed, a bell shaped flapper valve with an annular flange situated on and sealing the valve seat, the flapper valve pivoting off the valve seat when the toilet is flushed, the flapper valve having walls forming a bell shaped interior cavity therein with a lower opening through the walls, the flapper valve becoming buoyant within the water after it pivots off the valve seat due to air entrapped within its interior cavity, said water saving device comprising:
a modification to the flapper valve, said modification defining a second opening in the walls forming the interior cavity, said second opening communicating with the interior cavity therein;
a flexible tube having a first end, a second end, and a central air passageway having a diameter, said flexible tube first and operably connected to said second opening of the flapper valve to communicate said flexible tube central air passageway to said flapper valve interior cavity; and
a cylinder situated with the toilet reservoir tank, said cylinder operably connected to said flexible tube second end, said cylinder having an open end and a closed end to form an interior volume, said open end allowing entrance of water into said interior volume, said cylinder having a diameter substantially greater than said flexible tube diameter, said flexible tube central passageway communicating with said cylinder interior volume through said closed end whereby then the flapper valve is pivoted off the valve seat to flush the toilet and the water level in the tanks falls, water inside said cylinder also retreats through said open end, drawing air from inside the exterior cavity of the flapper valve through the flexible tube and into the cylinder which when sufficient air has left the flapper valve and accumulated within the cylinder interior volume, the flapper valve becomes non-buoyant and returns to its sealing position on the valve seat, thereby terminating the flushing of the toilet and resulting in a partial flush.

2. The water saving device for toilets as defined in claim 1 wherein said cylinder has an open end and a closed end, said closed end situated below the pre-flush water level.

3. The water saving device for toilets as defined in claim 2 wherein said cylinder is situated in the reservoir tank with said open end at a level lower than said closed end.

4. The water saving device for toilets as defined in claim 3 wherein said cylinder closed end defines an opening therethrough, said opening receiving said flexible tube second end to thereby communicate said flexible tube central passageway to said cylinder interior volume.

5. The water saving device for toilets as defined in claim 4 further including a tube holder, said tube holder operably attached to said flexible tube and to the toilet reservoir tank, said tube holder securing a portion of said flexible tube above said pre-flush water level.

6. A water saving device providing partial flush capability for toilets of the type having a reservoir tank to contain water for flushing, the water having a pre-flush level in the reservoir tank, a valve seat situated in the bottom of the reservoir tank through which the stored water passes when the toilet is flushed, a bell shaped flapper valve with an annular flange situated on and sealing the valve seat, the flapper valve pivoting off the valve seat when the toilet is flushed, the flapper valve having walls forming a bell shaped interior cavity therein with a lower opening through the walls, the flapper valve becoming buoyant within the water after it pivots off the valve seat due to air entrapped with this interior cavity, said water saving device comprising:
a short piece of rigid tube, said tube having a first end sharpened to a point, a second end, and a central air passageway therethrough, said central air passageway communicating with said flapper valve interior cavity;
a flexible tube having a first end, a second end, and a central air passageway having a diameter, said flexible tube first end operably connected to said rigid tube second end to communicate said flexible tube central air passageway to said rigid tube central air passageway; and a cylinder situated with the toilet reservoir tank, said cylinder operably connected to said flexible tube second end, said cylinder having an open end and a closed end to form an interior volume, said open end allowing entrance of water into said interior volume, said cylinder having a diameter substantially greater than said flexible tube diameter, said flexible tube central passageway communicating with said cylinder interior volume through said closed end whereby when the flapper valve is pivoted off the valve seat to flush the toilet and the water level in the tank falls, water inside said cylinder also retreats through said open end, drawing air from inside the interior cavity of the flapper valve through the flexible tube and into the cylinder interior volume which when sufficient air has left the flapper valve and accumulated within the cylinder interior volume, the flapper valve becomes non-buoyant and returns to its sealing position on the valve seat, thereby terminating the flushing of the toilet and resulting in a partial flush.

7. The water saving device for toilets as defined in claim 6 wherein said cylinder has an open end and a closed end, said closed end situated below the pre-flush water level.

8. The water saving device for toilets as defined in claim 7 wherein said cylinder is situated in the reservoir tank with said open end at a level lower than said closed end.

9. The water saving device for toilets as defined in claim 3 wherein said cylinder closed end defines an opening therethrough, said opening receiving said flexible tube second end to thereby communicate said flexible tube central passageway to said cylinder interior volume.

10. The water saving device for toilets as defined in claim 9 further including a tube holder, said tube holder operably attached to said flexible tube and to the toilet reservoir tank, said tube holder securing a portion of said flexible tube above said pre-flush water level.

* * * * *